United States Patent
Gillespie et al.

(10) Patent No.: US 11,456,980 B2
(45) Date of Patent: *Sep. 27, 2022

(54) SYSTEMS AND METHODS FOR DISTRIBUTED ELECTRONIC COMMUNICATION AND CONFIGURATION

(71) Applicant: CORDIAL EXPERIENCE, INC., San Diego, CA (US)

(72) Inventors: Adam Gillespie, San Diego, CA (US); Chris McGreal, San Diego, CA (US); Daniel Smith, San Diego, CA (US)

(73) Assignee: CORDIAL EXPERIENCE, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/196,878

(22) Filed: Mar. 9, 2021

(65) Prior Publication Data

US 2022/0029938 A1 Jan. 27, 2022

Related U.S. Application Data

(63) Continuation of application No. 16/808,065, filed on Mar. 3, 2020, now Pat. No. 10,972,412, which is a continuation of application No. 16/291,997, filed on Mar. 4, 2019, now Pat. No. 10,623,349, which is a
(Continued)

(51) Int. Cl.
*H04L 51/046* (2022.01)
*H04L 51/214* (2022.01)
*H04L 51/52* (2022.01)
*H04L 51/234* (2022.01)

(52) U.S. Cl.
CPC .......... *H04L 51/046* (2013.01); *H04L 51/214* (2022.05); *H04L 51/234* (2022.05); *H04L 51/52* (2022.05)

(58) Field of Classification Search
CPC ....... G06Q 10/107; H04L 51/06; H04L 51/12; H04L 51/14; H04L 51/22
See application file for complete search history.

(56) References Cited

U.S. PATENT DOCUMENTS

2008/0171573 A1 7/2008 Eom et al.
2009/0248694 A1* 10/2009 Martinez ............... G06F 16/243
(Continued)

FOREIGN PATENT DOCUMENTS

EP 1239389 A2 9/2002

OTHER PUBLICATIONS

International Search Report and Written Opinion received in PCT/US2016/049789 dated Jan. 13, 2017, 7 pages.
(Continued)

*Primary Examiner* — Joe Chacko
(74) *Attorney, Agent, or Firm* — Procopio, Cory, Hargreaves & Savitch LLP

(57) ABSTRACT

A system, comprising: at least one hardware processor; at least one executable software module that, when executed by the hardware processor, performs operations comprising: detecting a first event associated with a contact; in response to detecting the first event: collecting environment data associated with the first event; selecting a first of a plurality of actions based at least in part on the environment data; and performing the first action.

10 Claims, 15 Drawing Sheets

Related U.S. Application Data continuation of application No. 15/253,751, filed on Aug. 31, 2016, now Pat. No. 10,225,217.

(60) Provisional application No. 62/212,540, filed on Aug. 31, 2015, provisional application No. 62/212,538, filed on Aug. 31, 2015, provisional application No. 62/212,543, filed on Aug. 31, 2015.

(56) References Cited

U.S. PATENT DOCUMENTS

| | | |
|---|---|---|
| 2010/0082751 A1* | 4/2010 | Meijer .................... G06F 15/16 709/206 |
| 2012/0016733 A1 | 1/2012 | Belvin et al. |
| 2012/0046068 A1 | 2/2012 | Katpelly et al. |
| 2013/0218871 A1 | 8/2013 | McConnell et al. |
| 2014/0019228 A1* | 1/2014 | Aggarwal ............... H04L 51/14 705/14.43 |
| 2014/0372539 A1 | 12/2014 | Zaver |
| 2015/0057035 A1 | 2/2015 | Somekh et al. |
| 2015/0149277 A1 | 5/2015 | Mankoff et al. |
| 2015/0179087 A1 | 6/2015 | Chen et al. |

OTHER PUBLICATIONS

Extended European Search Report dated Mar. 25, 2019 for related EP Patent Application No. 16842950.4, in 8 pages.

\* cited by examiner

SYSTEMS AND METHODS FOR DISTRIBUTED ELECTRONIC COMMUNICATION AND CONFIGURATION

RELATED APPLICATIONS

This patent document is a continuation of U.S. patent application Ser. No. 16/808,065, filed Mar. 3, 2020, which is a continuation of U.S. patent application Ser. No. 16/291, 997, filed on Mar. 4, 2019, now U.S. Pat. No. 10,623,349, issued on Apr. 14, 2020, which is a continuation of U.S. patent application Ser. No. 15/253,751, filed on Aug. 31, 2016, now U.S. Pat. No. 10,225,217, issued on Mar. 5, 2019, which claims benefit of priority under 35 U.S.C. 119(e) to U.S. Provisional Patent Application No. 62/212,538, filed on Aug. 31, 2015, U.S. Provisional Application No. 62/212, 540, filed on Aug. 31, 2015 and U.S. Provisional Application No. 62/212,543, filed on Aug. 31, 2015. The disclosures of the above applications are incorporated by reference in their entirety as a part of this document

BACKGROUND

1. Technical Field

The various embodiments described herein are related to electronic communication, and more particularly to automation of electronic messaging.

2. Related Art

Electronic communication (e.g., electronic mail (email), short message service (SMS), push notification, etc.) tends to be a more economical and accessible advertisement channel than traditional printed mediums such as catalogs, flyers, brochures, and mailers. Thus, marketers may prefer to rely on electronic communication when reaching out to existing and potential customers.

However, electronic communications are generally transmitted without meaningful planning or afterthought. Specifically, conventional electronic communication services are unable to systematically generate appropriate content and track dispatched messages. As such, marketers may ultimately find electronic communications (e.g., email campaigns) to be less effective than print counterparts.

SUMMARY

Systems and methods for a communications platform are provided.

Other features and advantages of the present inventive concept should be apparent from the following description which illustrates by way of example aspects of the present inventive concept.

BRIEF DESCRIPTION OF THE DRAWINGS

The above and other aspects and features of the present inventive concept will be more apparent by describing example embodiments with reference to the accompanying drawings, in which:

FIG. 11, FIG. 12 and FIG. 13 illustrate GUIs of a communications platform according to various embodiments.

DETAILED DESCRIPTION

While certain embodiments are described, these embodiments are presented by way of example only, and are not intended to limit the scope of protection. The methods and systems described herein may be embodied in a variety of other forms. Furthermore, various omissions, substitutions, and changes in the form of the example methods and systems described herein may be made without departing from the scope of protection.

Figure 1:
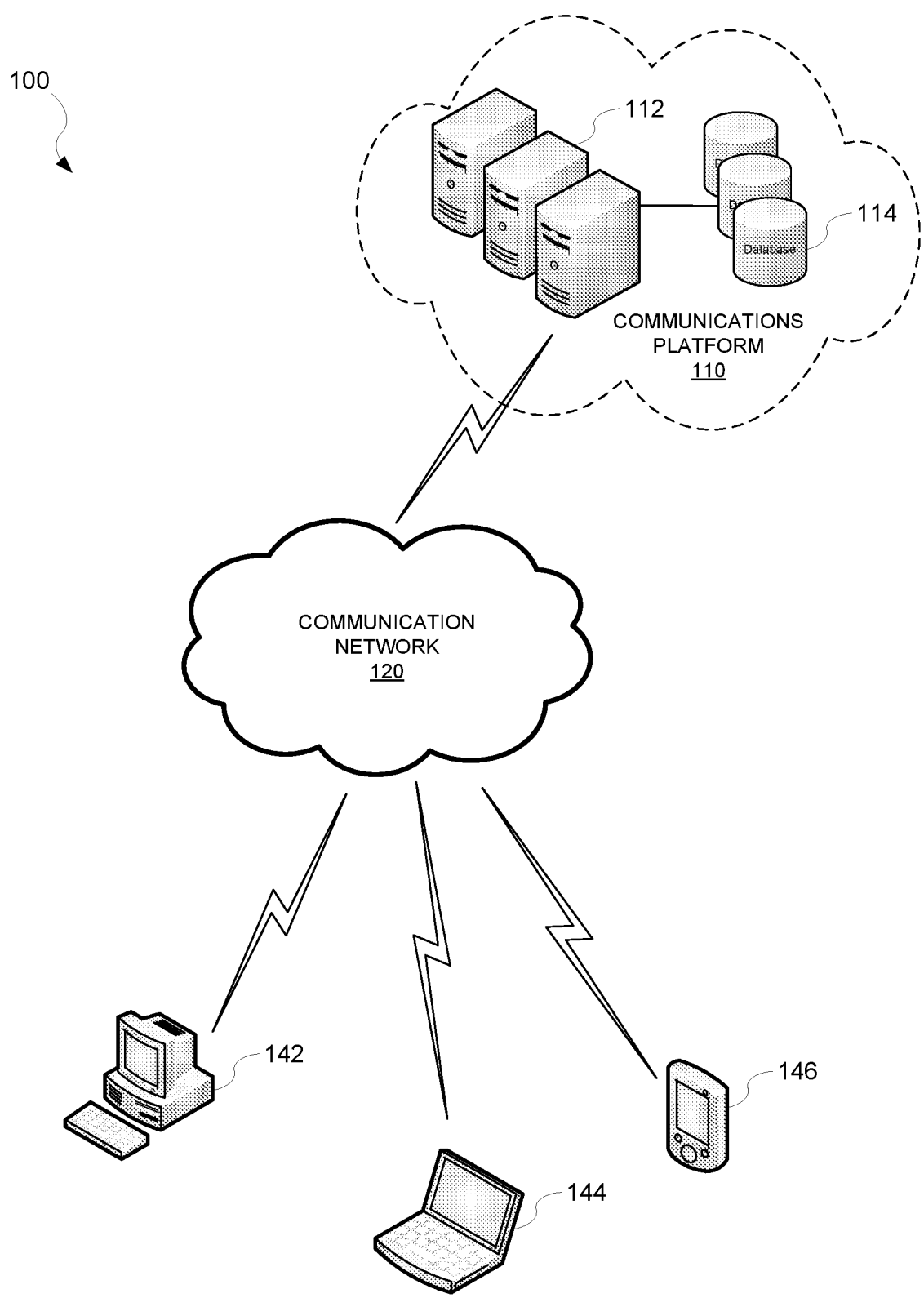
FIG. 1 is a block diagram illustrating a network environment according to various embodiments.

FIG. 1 is a block diagram illustrating a network environment 100 according to various embodiments. Referring to FIG. 1, a communications platform 110 can include one or more servers 112 and one or more databases 114. In various embodiments, the communications platform 110 can communicate with one or more devices via a communication network 120. In various embodiments, the communication network 120 can be, for example, but not limited to, a wireless or mobile communication network.

The communications platform 110 can communicate with devices including, for example, but not limited to, a first device 142, a second device 144, and a third device 146. In some embodiments, the first device 142 can be associated with a communication entity while the second device 144 and the third device 146 can each be associated with a target. For example, the communication entity can organize an electronic messaging (e.g., email) campaign by communicating one or more configurations for the electronic messaging campaign to the communications platform 110 via the first device 142 (e.g., a web application associated with the communications platform 110). The communications platform 110 can transmit one or more electronic communications to the second device 144 and/or the third device 146 based on the configurations received from the communication entity via the first device 142.

In various embodiments, the communications platform 110 can track or listen for one or more events and perform one or more actions in response to an event or a combination of events. As will be described in more detail below, the user (e.g., marketer) is able to provide configurations for an electronic messaging campaign to the communications platform 110 via a GUI. Configurations for an electronic messaging campaign can include, for example, but not limited to, customized content, events, triggers, schedules, and recipients.

Figure 2:
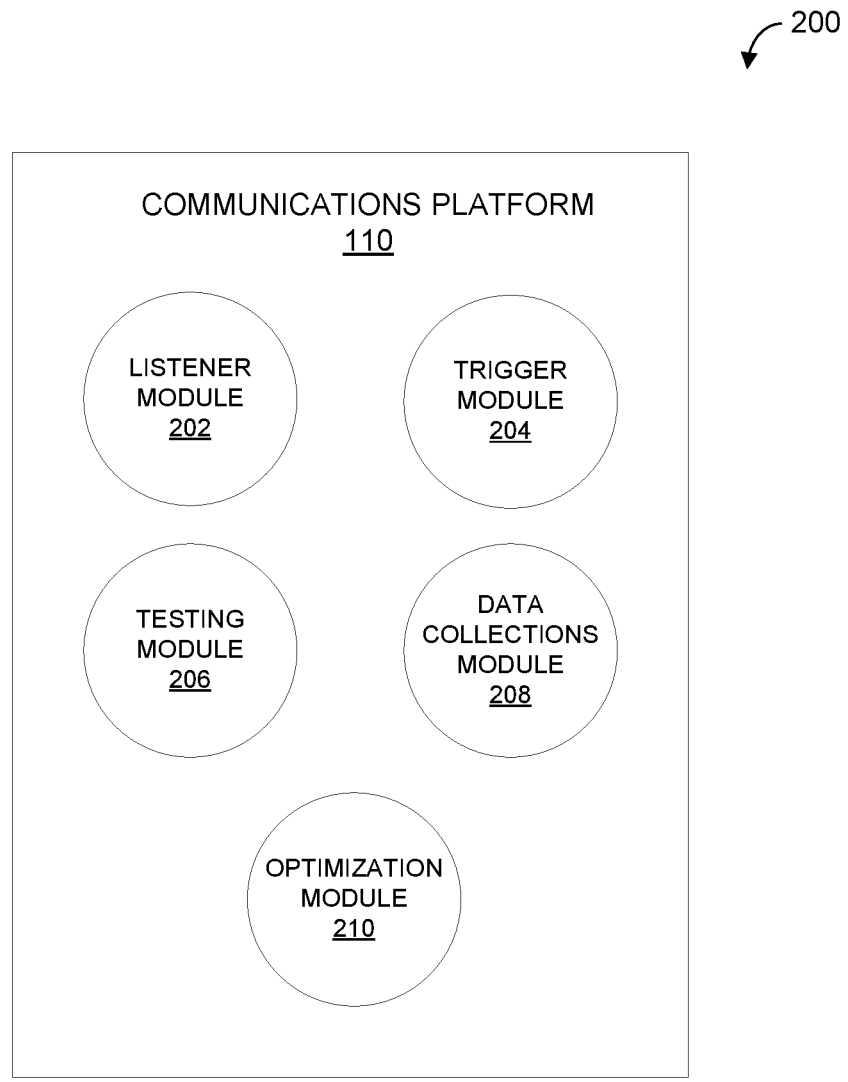
FIG. 2 is a block diagram illustrating a communications platform according to various embodiments.

FIG. 2 is a block diagram illustrating the communications platform 110 according to various embodiments. Referring to FIGS. 1-2, in various embodiments, the communications platform 110 can include a listener module 202 configured to listen for or detect one or more events including, for example, but not limited to, profile data events, email behavioral events, and supplemental data update events. As described in more details below, in various embodiments, the listener module 202 can be configured to listen for events reported back by one or more embedded listeners.

In various embodiments, the communications platform 110 can further include a trigger module 204 configured to perform one or more actions in response to an event, a combination of events, or a series of events detected by the listener module 202.

In various embodiments, the communications platform 110 can further include a testing module 206 configured to perform, for example, but not limited to, multi-variant testing for a plurality of electronic communications each having at least some different content.

In various embodiments, the communications platform 110 can further include a data collections module 208 configured to collect data including, for example, but not limited to a plurality of environment data associated with one or more events detected by the listener module 202.

In various embodiments, the communications platform 110 can further include an optimization module 210 configured to generate variants of electronic communications each having one or more mutations. According to one exemplary embodiment, the optimization module 210 can generate variant electronic communications in response to one or more events detected by the listener module 202. In various embodiments, the optimization module 210 can be further configured to determine one or more mutations based configurations communicated to the communications platform 110 by the user via the first device 142. Alternately or in addition, in various embodiments, the optimization module 210 can determine one or more variants based on results collected by the testing module 206 and/or data collected by the data collections module 208.

A person having ordinary skill in the art can appreciate that the communications platform 110 can include different modules. Moreover, it will be understood that the various modules comprise software and hardware required to perform the functions described. Exemplary hardware systems on which such software can run and which can form a part of the various modules or on which the modules can be configured to operate are described with respect to FIG. 8.

Figure 3:
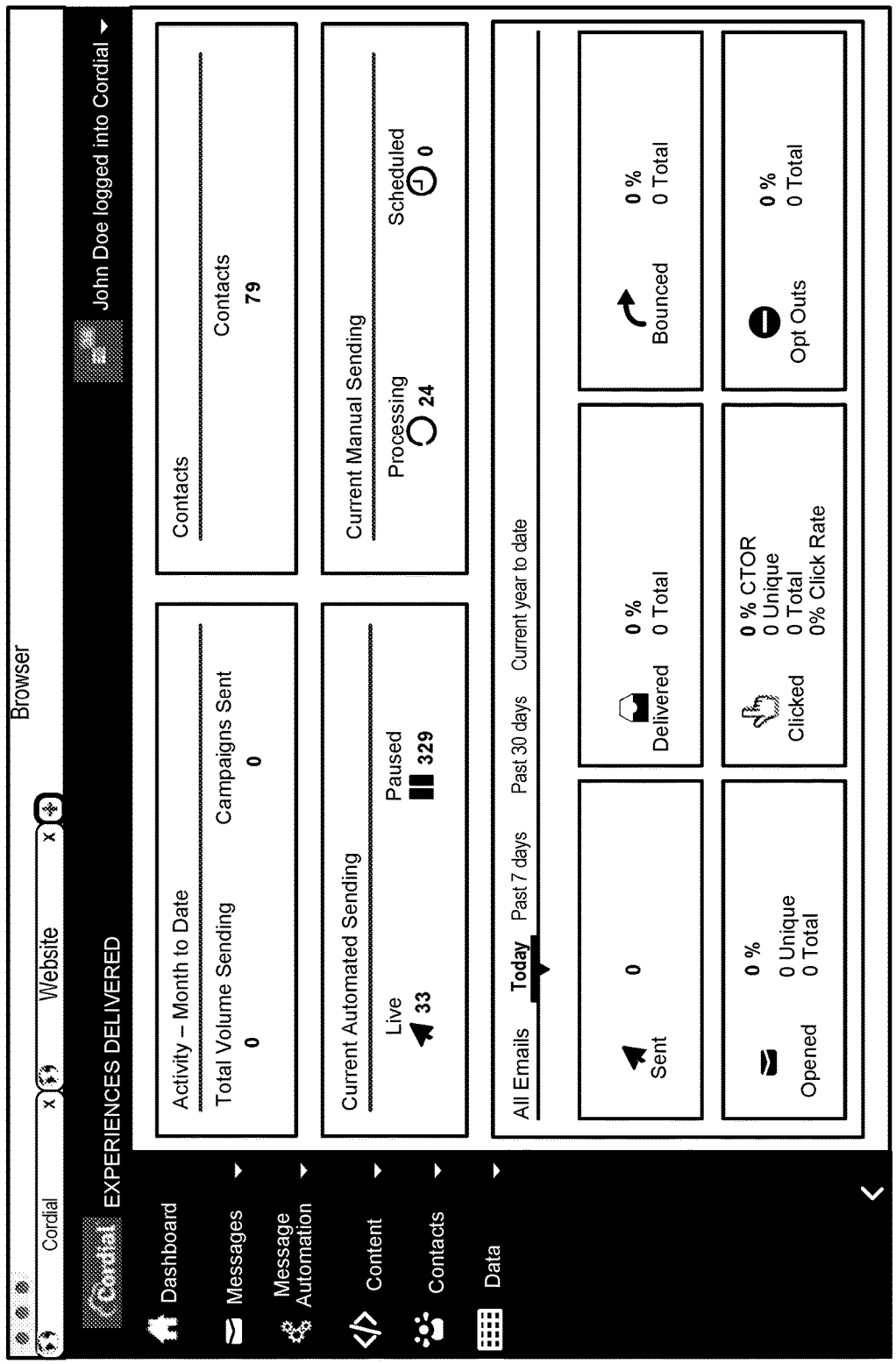
FIG. 3 illustrates a graphic user interface (GUI) of a communications platform according to various embodiments.

FIG. 3 illustrates a GUI of the communications platform 110 according to various embodiments. With references to FIG. 1-3, the GUI can display a dashboard presenting an overview of user activities for a user including, for example, but not limited to, one or more previous, current, and future electronic messaging campaigns. In various embodiments, a user can access the GUI via the first device 142 (or another device). A user can navigate and have access to various features of the communications platform 110 via the dashboard.

Figure 4:
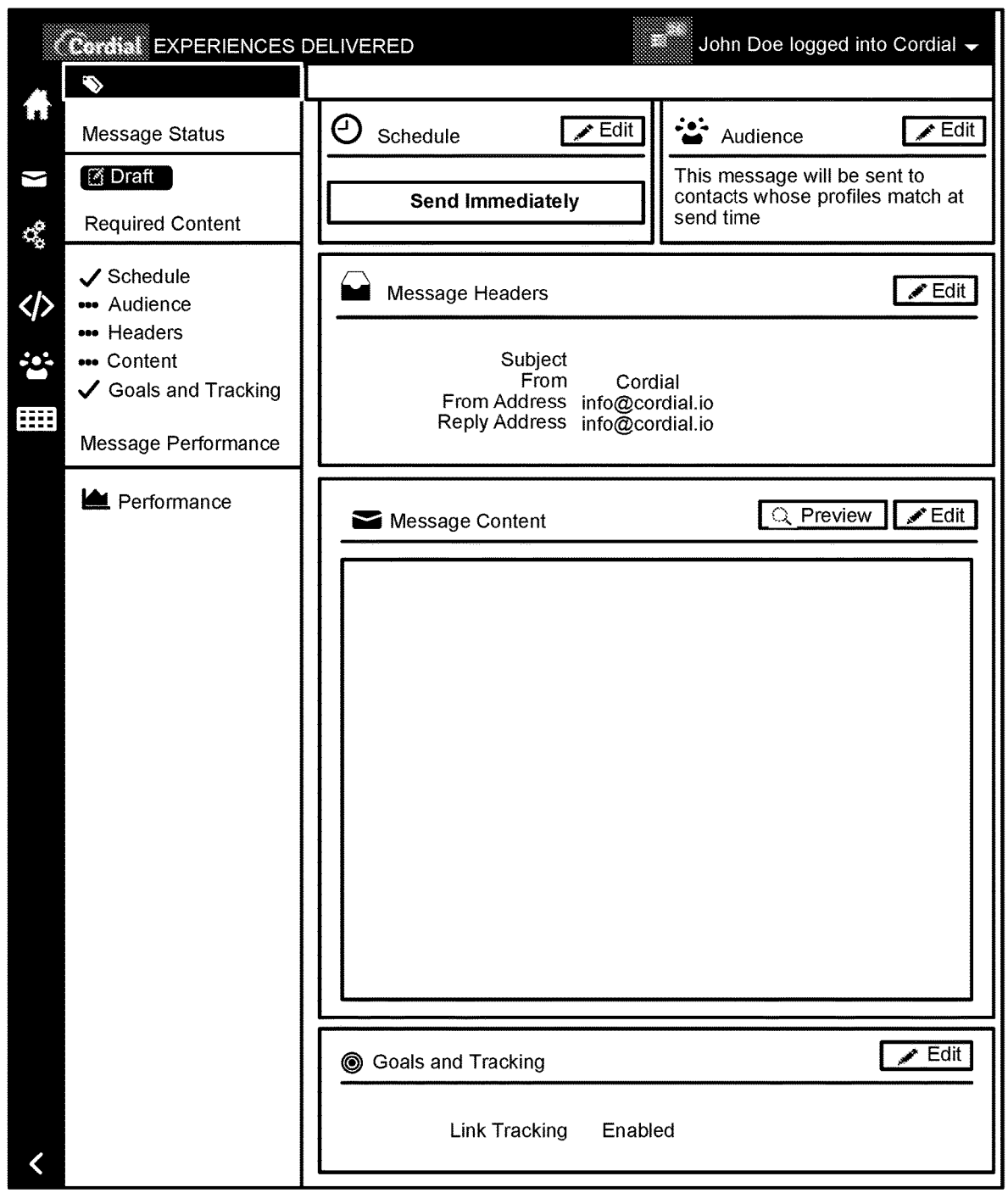
FIG. 4 illustrates a GUI of a communications platform according to various embodiments.

FIG. 4 illustrates a GUI of the communications platform 110 according to various embodiments. With references to FIGS. 1-4, the GUI can further display options for a user to compose and customize an electronic message (e.g., an email). For example, in addition to creating and editing a content of an electronic message, a user can also edit a scheduling and/or an audience for the electronic message. Moreover, the user can indicate one or more goals for the electronic messaging campaign as well as configure what and how activities (e.g., customer engagement with certain electronic communication) are tracked.

Figure 5:
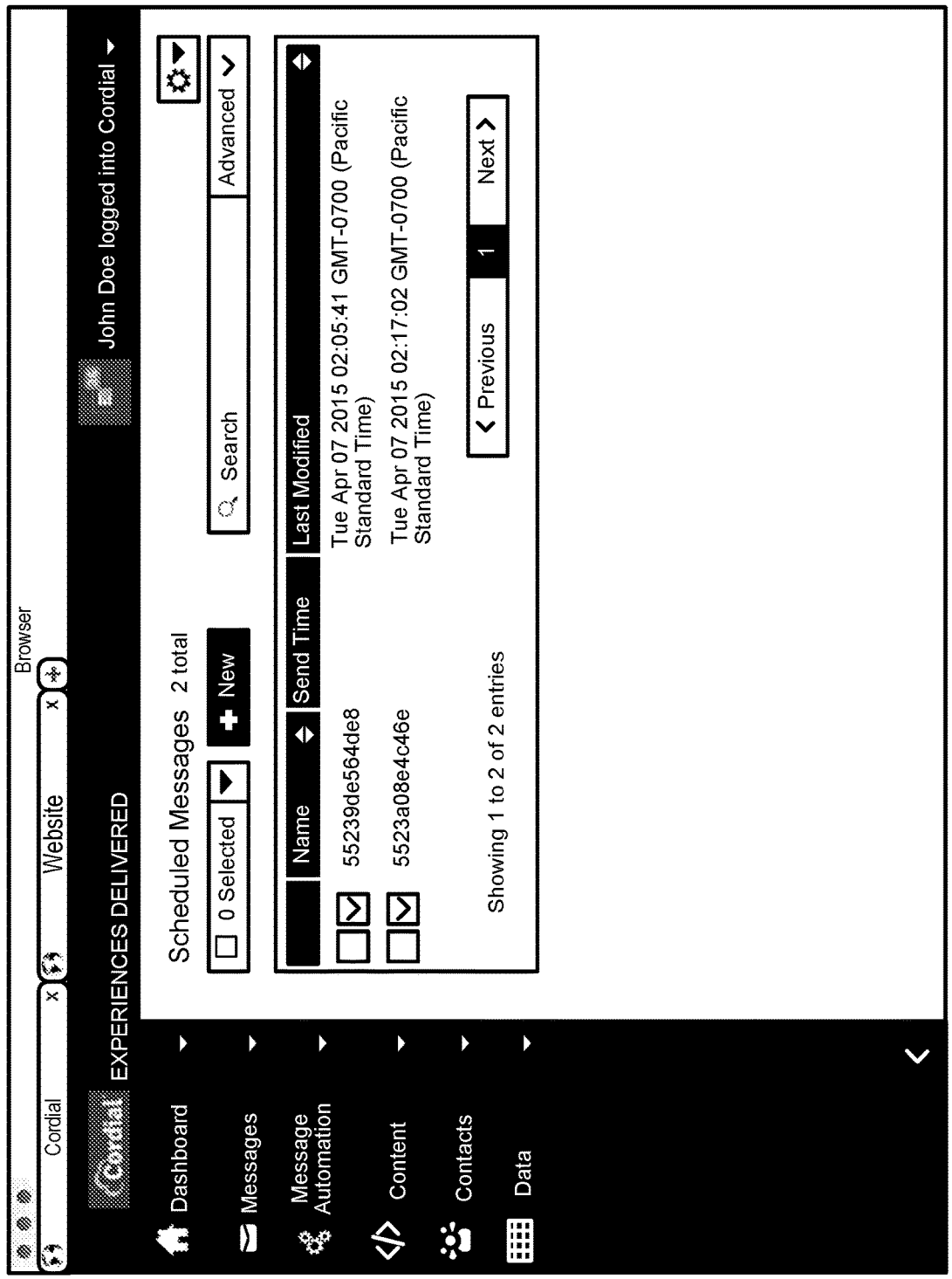
FIG. 5 illustrates a GUI of a communications platform according to various embodiments.

FIG. 5 illustrates a GUI of the communications platform 110 according to various embodiments. With references to FIGS. 1-5, the GUI can display a schedule of messages to be sent by the communications platform 110.

Figure 6:
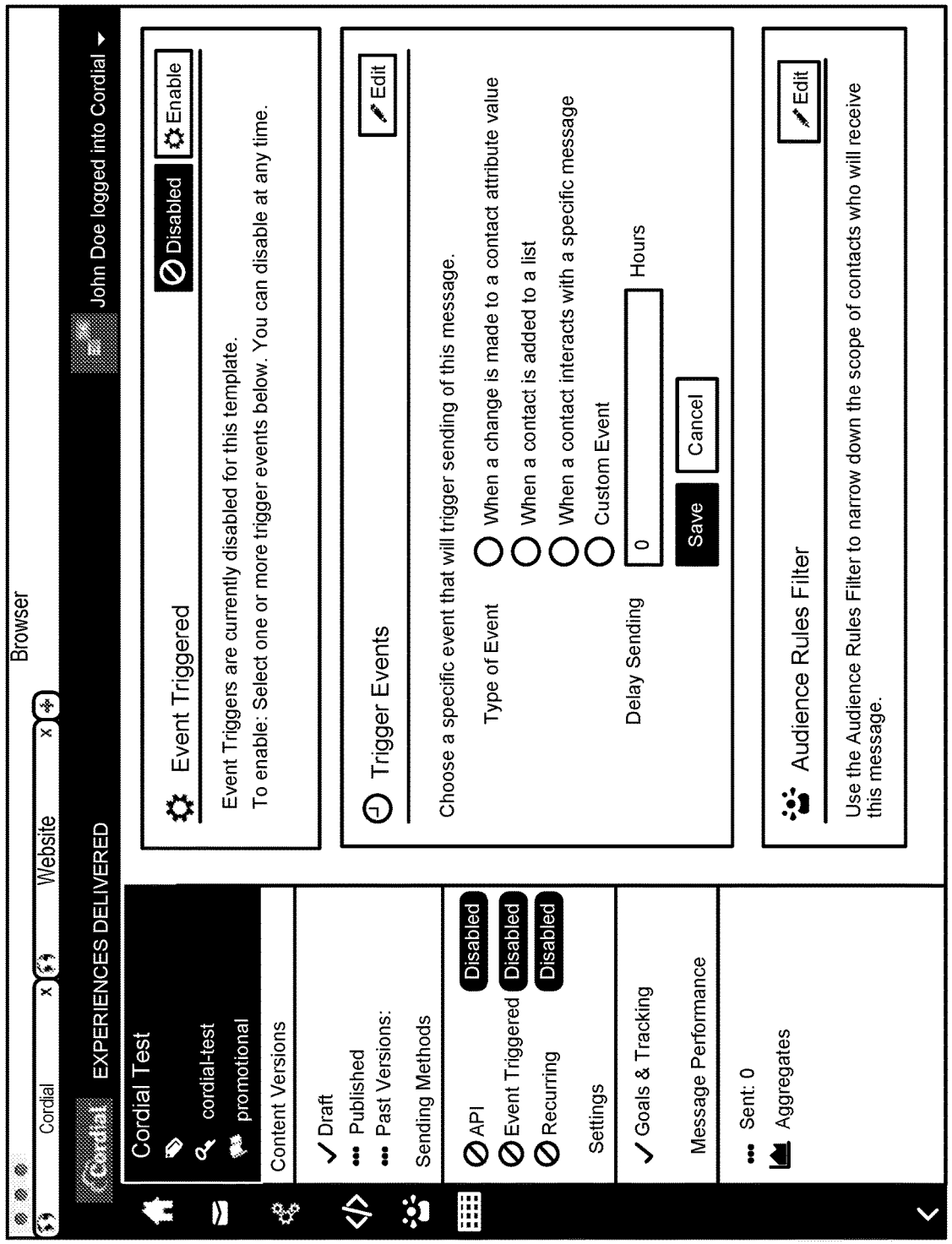
FIG. 6 illustrates a GUI of a communications platform according to various embodiments.

FIG. 6 illustrates a GUI of the communications platform 110 according to various embodiments. With references to FIGS. 1-6, the GUI can display options for a user to customize and configure various events for detection by the listener module 202. As will be described in more details below, events that can trigger one or more actions include, for example, but not limited to, profile data events (e.g., addition of or creation of a contact profile, change to a contact attribute value in a contact profile), email behavior events (e.g., when a contact interacts with a specific message), and/or supplemental data update events (e.g., custom events).

Figure 7A:
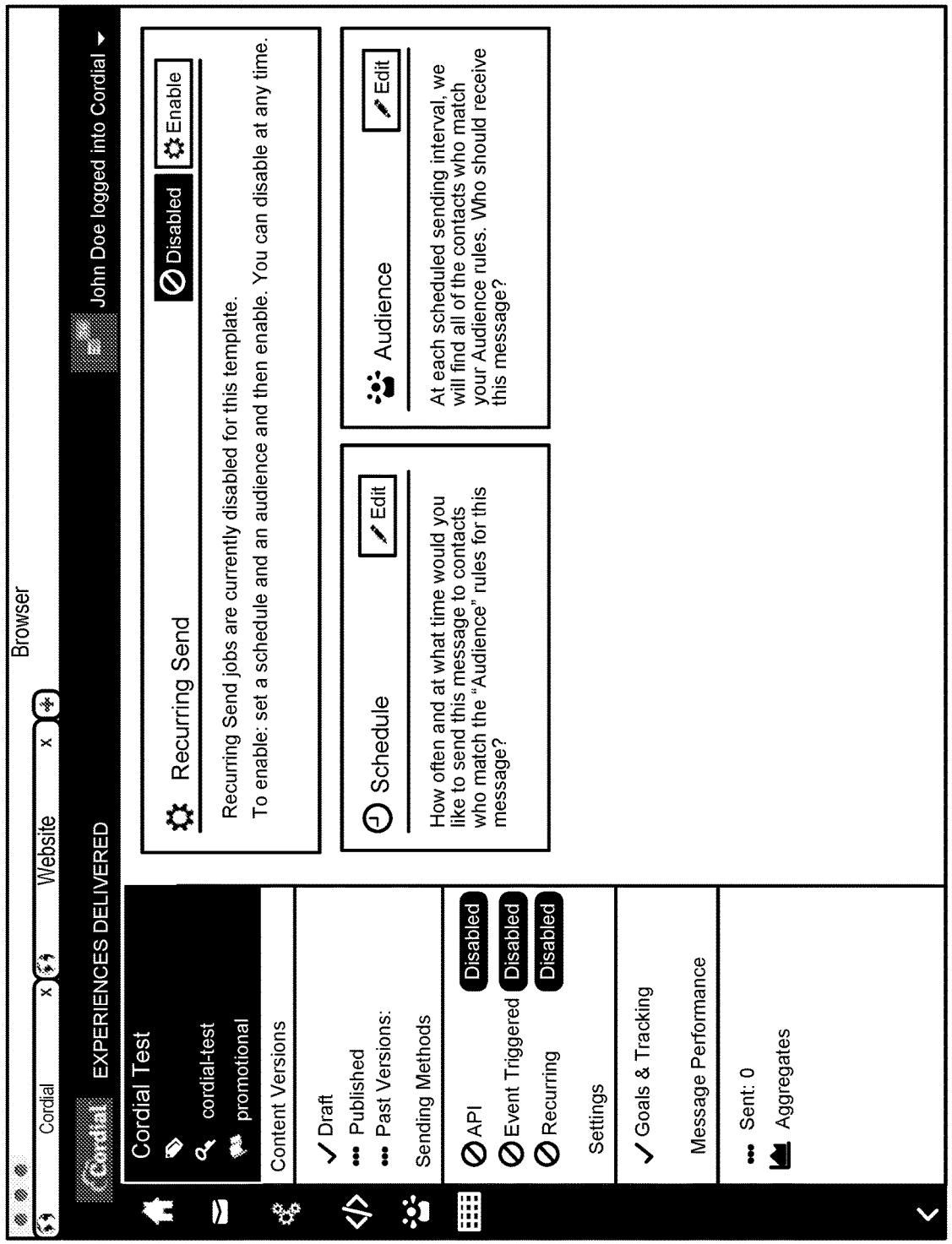
FIGS. 7A, 7B and 7C illustrate a GUI of a communications platform according to various embodiments.
Figure 7B:
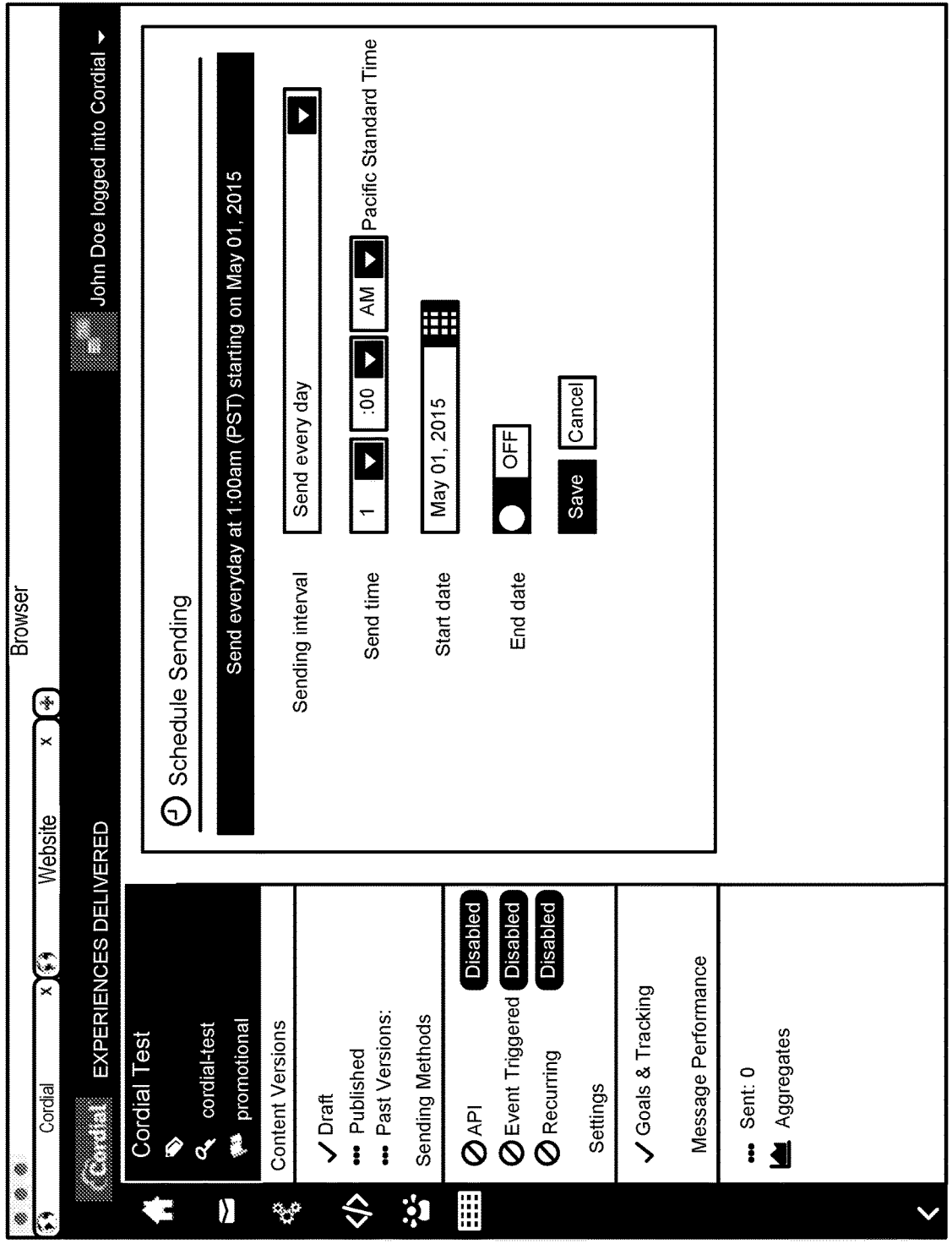
Figure 7C:
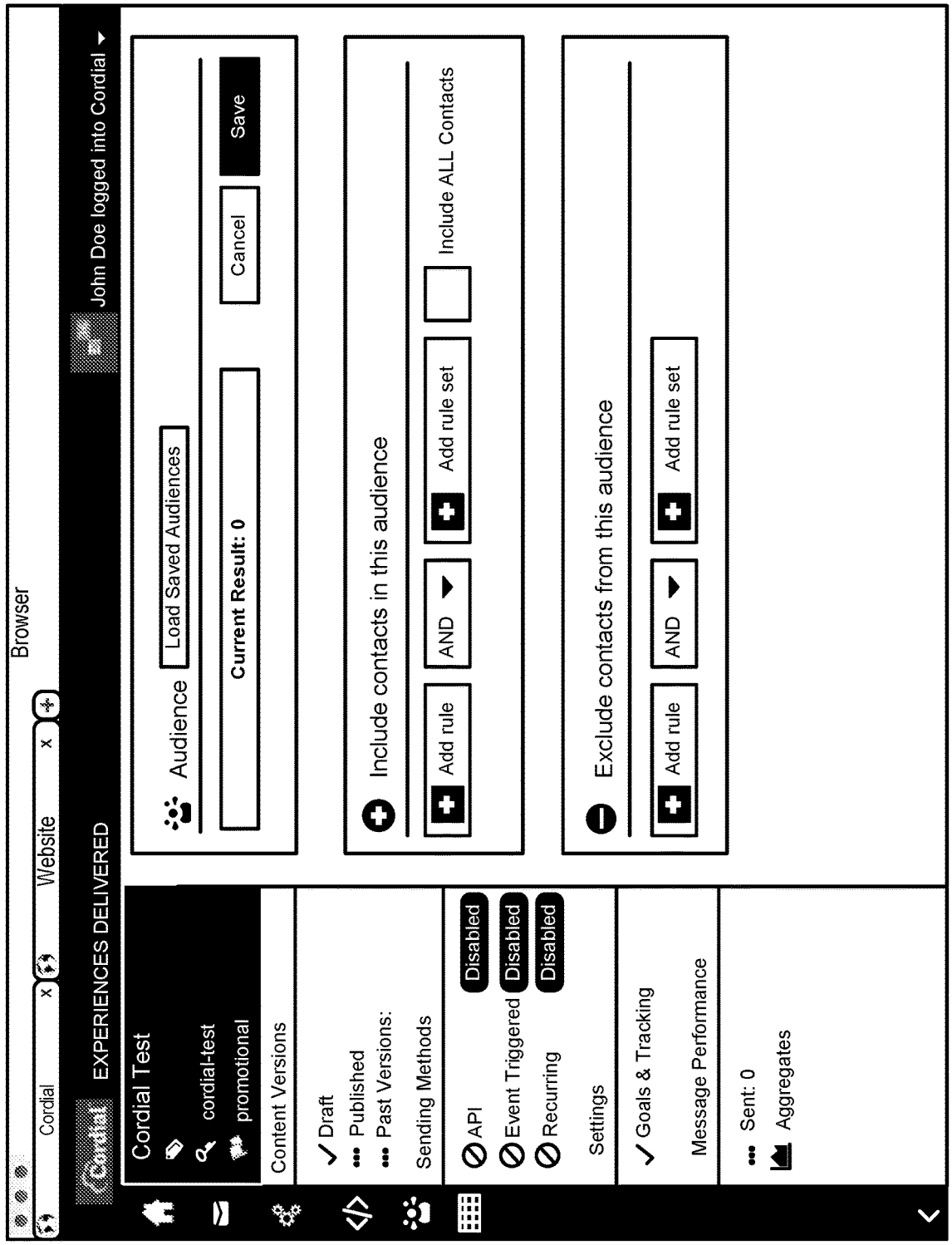

FIGS. 7A-7C illustrate a GUI of the communications platform 110 according to various embodiments. With references to FIG. 1-7C, the GUI can display options for a marketer to configure a recurring transmission schedule. For example, the marketer can configure a schedule (see FIG. 7B) and/or an audience (see FIG. 7C) for when electronic communication in an electronic messaging campaign can be sent on a recurring (e.g., intermittent or periodic) schedule.

Listeners and Triggers

In various embodiments, a trigger is a series of one or more actions that is performed (e.g., by the trigger module 204) in response to an event, a combination of events, or a series of events (e.g., detected by the listener module 202). In various embodiments, the one or more actions included in a trigger can include, for example, but not limited to, transmission of a message (e.g., email, SMS), pushing a notification, and instigating a proprietary or third-party application programming interface (API) callback or chained callback. According to one exemplary embodiment, multiple actions in a trigger can be ordered based on the event as well as results collected by the testing module 206 and/or data collected by the data collections module 208. Furthermore, the trigger module 204 can be configured to perform some or all of the actions in a trigger according to filters and/or time delays.

In various embodiments, a trigger can be associated with events including, for example, but not limited to, profile data events, email behavior events, and/or supplemental data update events. In one exemplary embodiment, the communications platform 110 can customize various aspects of the trigger based on the event causing the trigger. For example, a trigger can include additional electronic communication that is transmitted by the trigger module 204. Thus, additional electronic messages (e.g., emails, SMS text, push notifications) may be triggered as a result of events including, for example, but not limited to, updates to contact profile information, the additional of contact activity data, and the update or addition of supporting data collections. Moreover, the communications platform 110 can determine, based at least on the event, a content, transmission schedule, and/or delivery channel for the additional electronic communication transmitted by the trigger module 204 in response to the event.

According to one exemplary embodiment, the communications platform 110 can store (e.g., in the databases 114) profiles for a plurality of contacts (e.g., existing or potential customer). In various embodiments, a profile data event can include one or more events altering the profile of a contact (e.g., existing or potential customer). For example, the listener module 202 can detect when a potential customer subscribes to a newsletter or a mailing list in response to an electronic communication. Accordingly, the trigger module 204 can transmit an additional electronic communication (e.g., a welcome email) to the contact in response to the event.

Additionally, the listener module 202 can also detect updates to a contact attribute value. For example, the listener module 202 can determine when a contact makes a purchase (e.g., in response to an electronic communication) thereby increasing a number of purchases associated with the contact. The listener module 202 can also detect when a contact list association is updated. For example, the listener module 202 can detect when a marketer adds or removes an existing or potential customer from an electronic mailing list.

In various embodiments, an email behavior event can include, for example, but not limited to, sending a message, opening a message, clicking a message, sharing a message, purchasing from or as a result of a message, and opting out of a message (e.g., unsubscribing, designating as spam).

In various embodiments, the listener module 202 can listen for changes to supplemental data while the trigger module 204 can perform actions such as the transmission of additional (e.g., follow-up) messages (e.g., email, SMS). For example, the trigger module 204 can transmit additional messages when the listener module 202 detects new flight delay information.

Figure 10:
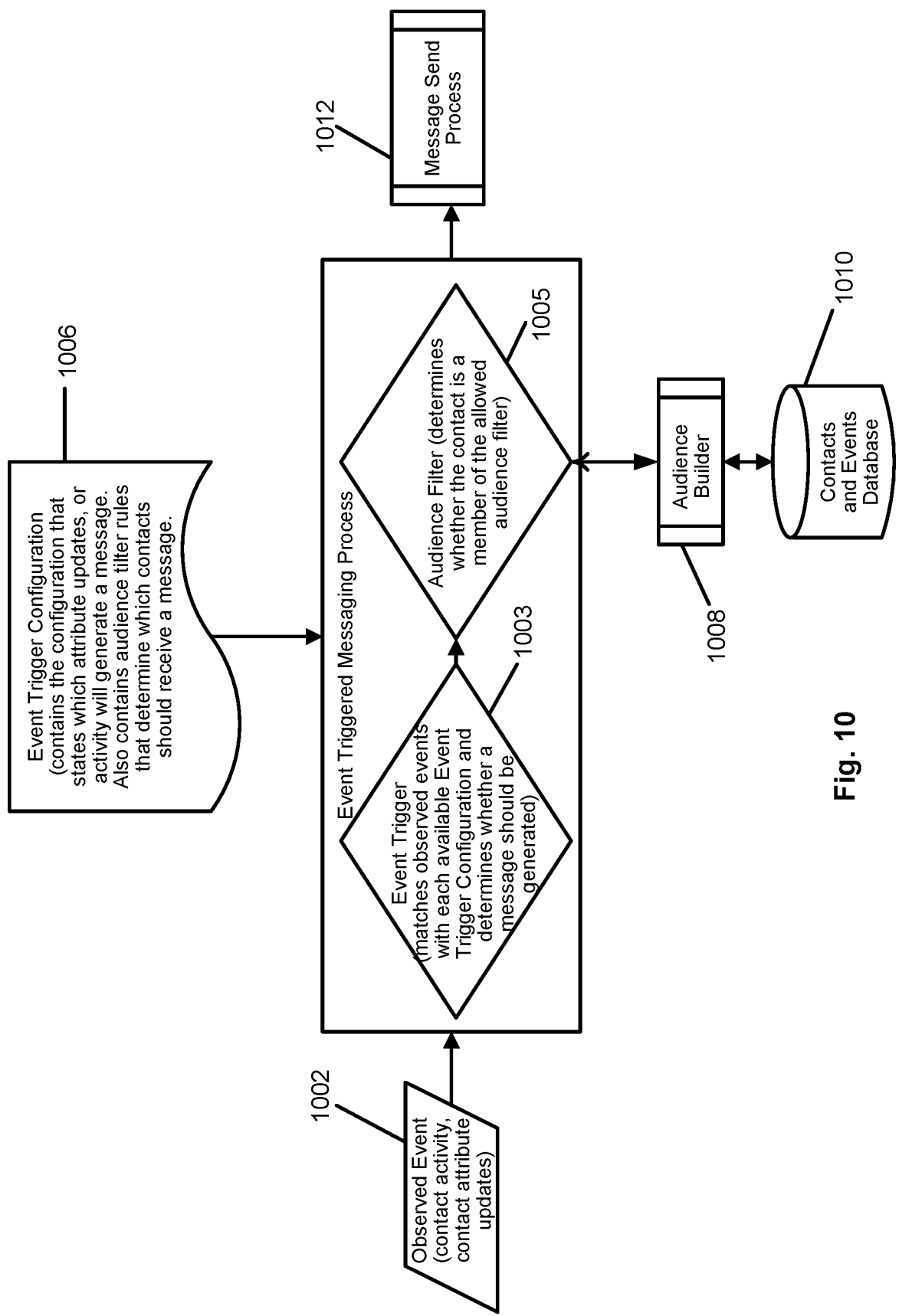
FIG. 10 is a diagram illustrating a system and process for event triggered messaging in accordance with one embodiment.

In the systems and methods described herein, the event triggered messaging can also be combined with audience filtering as illustrated in FIG. 10. As can be seen, in step 1002 a event can be observed, e.g., by event observation module 916. This can then activate event triggered messaging process 1004, which can comprise an event trigger 1003 and an audience filter 1005. The event trigger module 1003 determines of the observed event matches an available event trigger configuration, in which case the appropriate message can be generated. But first, the audience filter 1005 can determine whether the contact associated with the observed event is a member of an allowed audience associate with the message. Audience filter 1005 can take input form an audience builder 1008 that uses data stored in database 1010. If the event trigger 1003 and audience filter 1005 indicate that the message can be generated, then a message send process 1012 can be invoked.

Figure 11:
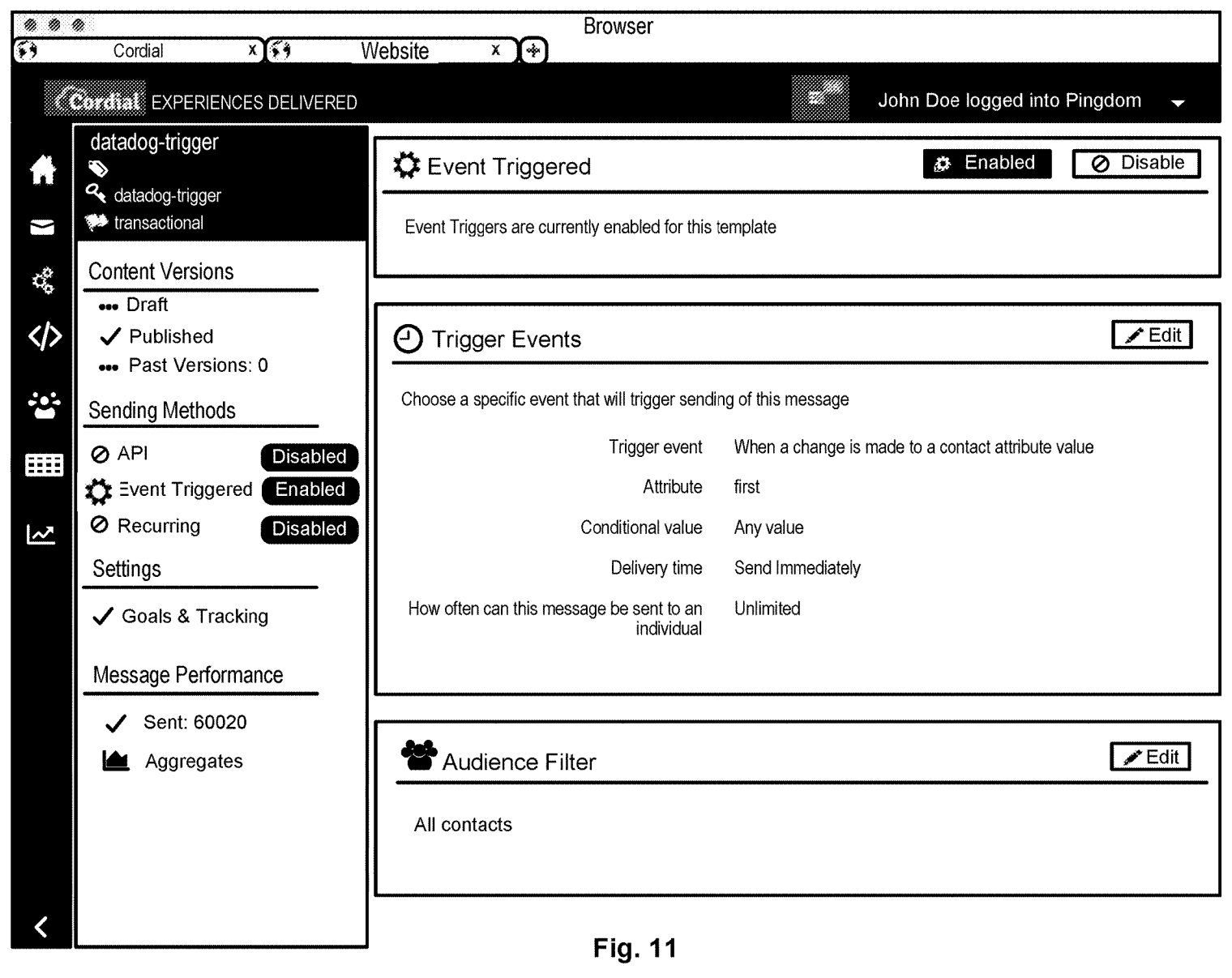
Figure 12:
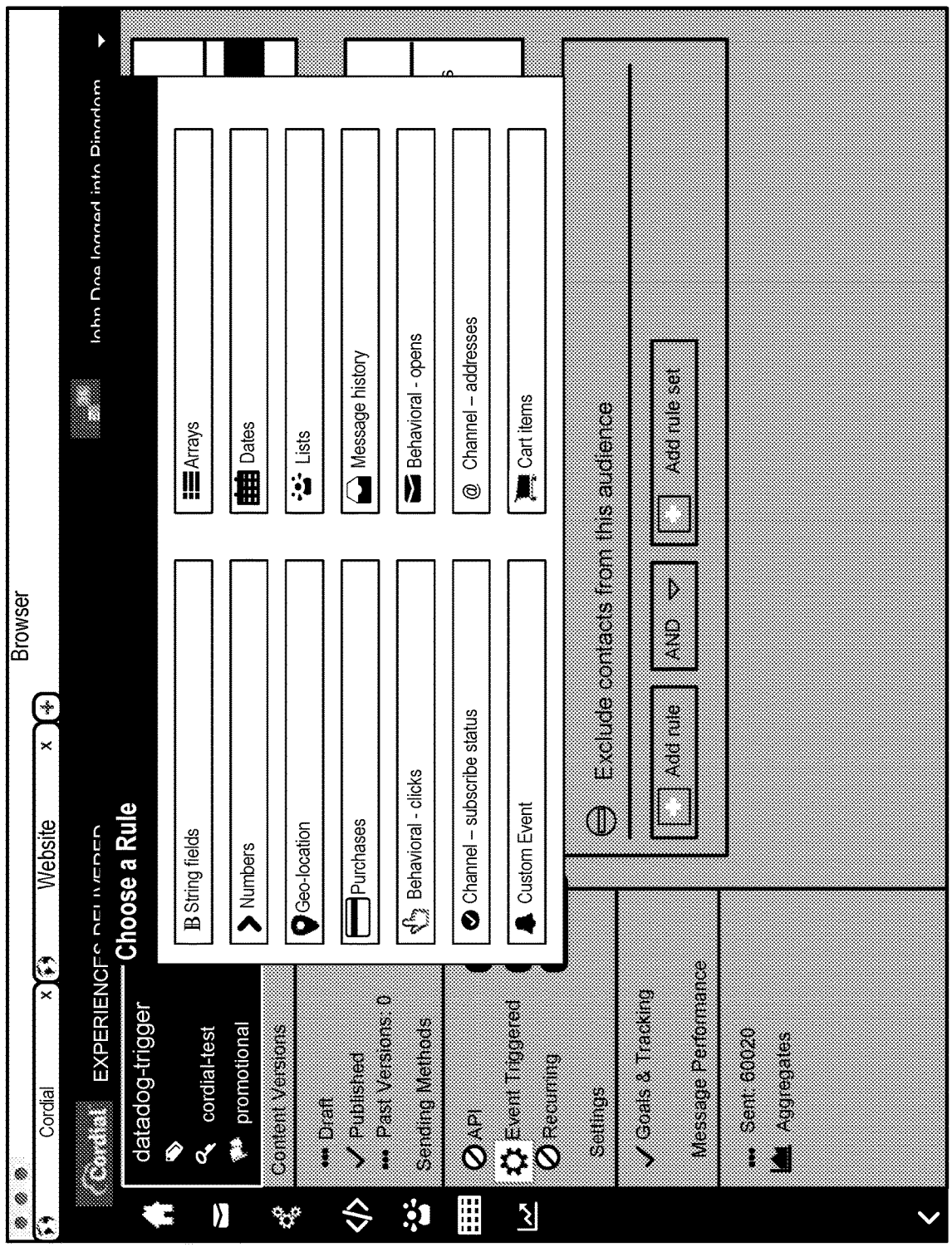
Figure 13:
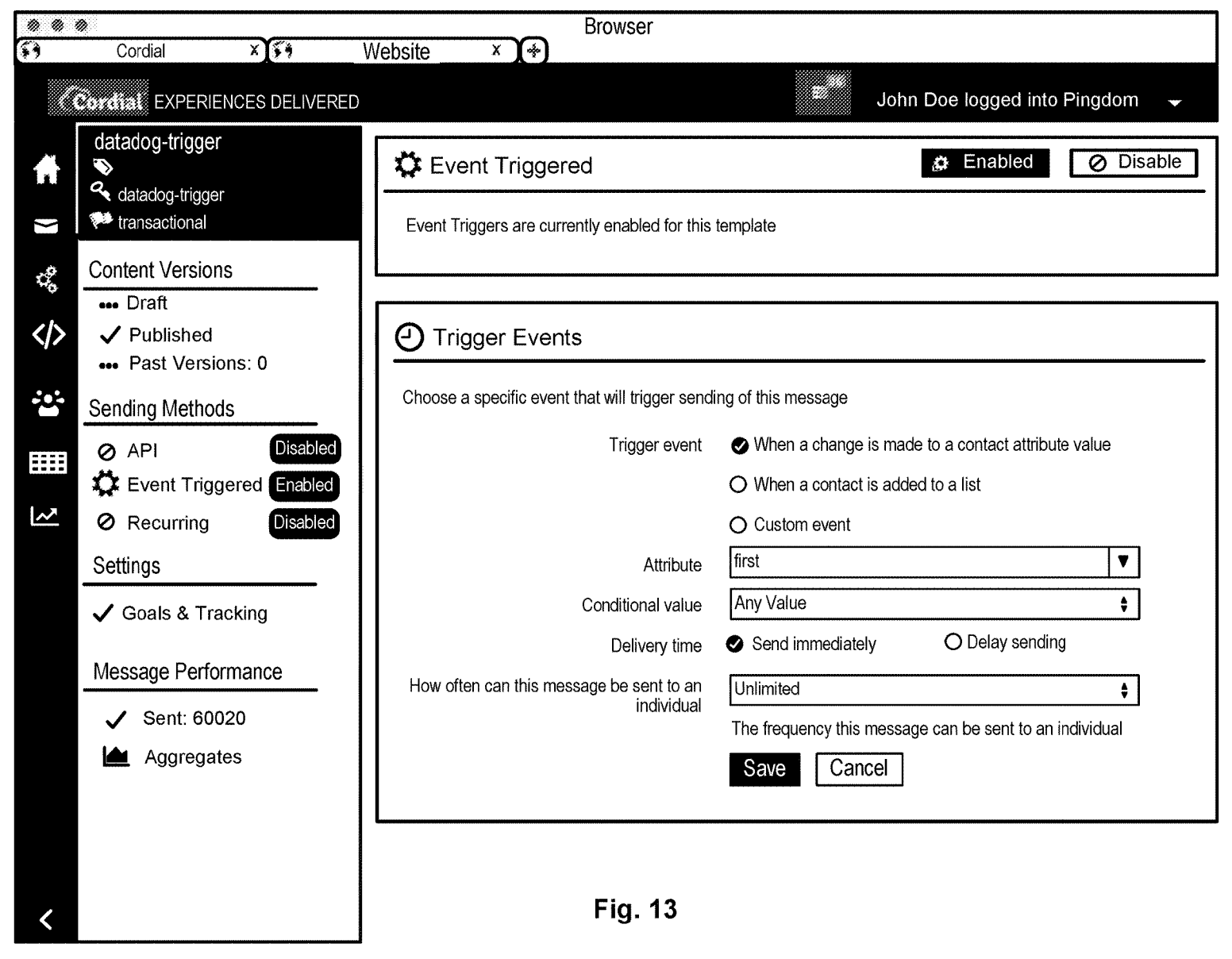

The event trigger messaging process can receive as input event trigger configurations as mentioned above. FIG. 11 is a UI illustrating such a configuration. This particular configuration occurs when a contact attribute associated with a contact is changed. Also, in this case, the audience comprises all contacts. FIG. 12 illustrates that the trigger configurations can be created from various defined rules, the selection of which can open a configuration set up window as illustrated but the UI of FIG. 13. The UI of FIG. 13 can include drop down menus or windows into which appropriate selections can be made or input.

Embedded Listeners

In various embodiments, behavior exhibited by one or more contacts (e.g., potential or existing customer) on a website can be observed by an embedded listener. In various embodiments, the embedded listener can be a Javascript SDK installed on the website and configured to transmit data associated with the contact back to the listener module 202. In various embodiments, in response to one or more events reported by an embedded listener, the listener module 202 can cause an update to the corresponding contact profile.

Environment Data

In various embodiments, the data collection module 208 can collect a variety of data including environment data associated (e.g., contemporaneous) with an event detected by the listener module 202. Environment data can include, for example, but not limited to, the location of the contact, the weather at the location, social media (e.g., trending Twitter® topics), and stock market performance when an event is detected by the listener module 202. The communications platform 110 can associate at least a portion of environment data with a detected event, and determine one or more correlations between environment data and one or more detected events. According to one exemplary embodiment, correlations between environment data and events can be used when configuring a future electronic messaging campaign.

Multi-Variable Testing

According to one exemplary embodiment, the testing module 206 can perform multi-variable testing to identify one or more options (e.g., user configured and/or automatically generated) having a better message performance. In various embodiments, A|B testing or Thompson Sampling can be applied in order to identify factors and combinations thereof that yields the best message performance. For example, digital communication touchpoint generally refers to the digital channel (e.g., email, SMS, push notification) used to communicate one or more messages to a user. One form of A|B testing or Thompson Sampling may determine which digital communication touchpoint optimizes message performance (e.g., as measured by metrics such as click through rate, purchase conversion, etc.).

Furthermore, in one exemplary embodiment, the testing module 206 is configured to apply A|B testing to a full sequence of messages; however, in the embodiments described herein a Thompson Sampling algorithm combined with either the natural messaging cadence or an imposed throttling algorithm to eliminate "regret", which in this case is the overaggressive testing of content that results in excess messaging to the "loser" content. The algorithm will narrow in on the best performing content quicker than with conventional testing, both in terms of time and in testing the least number of messages needed to arrive at the optimal content. That is, the testing module 206 can be configured to perform cross channel Thompson Sampling to determine whether a digital communication channel produced better results when one or more additional touchpoints accompanied the message sequence. For example, the testing module 206 may be configured to test whether a sequence of three emails (e.g., a welcome and nurture email program) performed better if a touchpoint (e.g., an SMS message or push notification) was inserted in between or in conjunction with some or all of the emails in the sequence.

Figure 9:
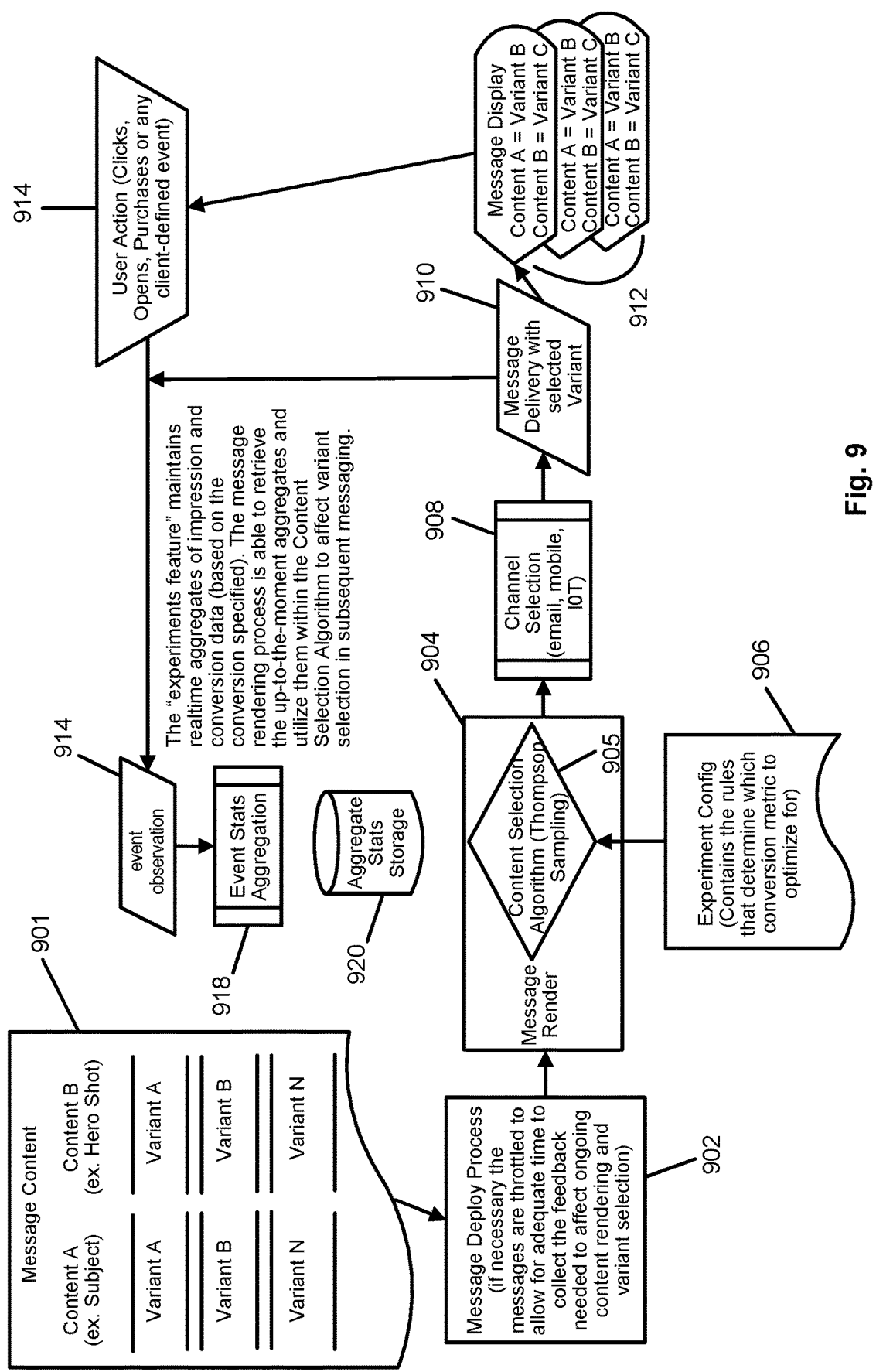
FIG. 9 is a diagram illustrating a system and process for multi-variant testing in accordance with one embodiment.

FIG. 9 is a diagram illustrating an example embodiment of A/B testing can be combined with Thompson Sampling and, e.g., throttling in accordance with one embodiment. As can be seen, a set of messages 901 comprising content A and variants thereof, and content B and variants thereof can be prepared and deployed in process 902. As indicated, the delivery of these messages can be throttled to allow for adequate time to collect the feedback needed to affect ongoing content rendering and variant selection in order hone in on the most effective messaging. In process 904, the messages are rendered. Process 904 can include a selection algorithm 905 that is implementing or includes a Thompson Sampling algorithm and that operates using an experiment configuration 906, which contains the rules that determine which conversion metric to optimize for. The selection algorithm 905 can also use aggregate stats form storage 920.

After the content is selected, a channel selection algorithm 908 can determine the correct communication channel or medium. The message with the selected variant (messages 912) can then be delivered in step 910. The selected message as well as any detected user action 914 can be fed back to event observation module 916 and event statistic aggregation module 918, which can then store aggregation results in storage 920.

In various embodiments, in additional to digital communication touchpoints or channels, an electronic messaging campaign can be customized with additional options that include, for example, but not limited to, message content and transmission schedule. For example, the testing module 206 can cause transmission of a plurality of electronic communication having different content options. Some electronic communication can contain a reminder (e.g., items left in cart) while other electronic communication can convey an offer of discount or a coupon. A marketer can establish (e.g., via configurations communicated via the first device 142) a goal such as maximizing volume or profit. Accordingly, the testing module 206 can collect engagement data (e.g., purchase conversion rate) and analyze the engagement data based on the marketer's goals. Thus, a reminder that converts to or results in a purchase will yield a higher profit margin than a discount offer that converts to or results in a purchase. In contrast, a discount or a coupon offer may yield higher volume but lower profit margin. The results from the multi-variable testing conducted by the testing module 206 can be used to modify or select the contents of future electronic communication. For example, contents that yielded positive results for a particular demographic group and with respect to a certain marketing goal can be applied in future campaigns targeting a similar demographic group and/or having a similar marketing goal.

Message Features

In various embodiments, the trigger module 204 can transmit one or more electronic communication to a contact (e.g., an existing or potential customer). According to one exemplary embodiment, contents of the electronic communication can be modified or varied based on configurations set by the user, results collected by the testing module 206, and/or data collected by the data collections module 208.

In one embodiment, at least some of the electronic communication (e.g., emails) can include a "remind me later" option. In some embodiments, the "remind me later" option may be presented as a set of dynamically generated buttons appearing in (e.g., at the top of) the electronic communication. Alternately, in some embodiments, the "remind me later" option can be presented as a scroll down menu. Each of the buttons or scroll down menu selections may provide a choice (e.g., of a date and/or time) for a recipient of the electronic communication to receive the same message at a later time. According to one exemplary embodiment, the choices provided to the recipient can be time choices (e.g., specific or relative times) determined based on when the recipient opened the electronic communication. For example, if the electronic communication was opened LOAM, the time choices offered to the recipient to receive the same communication again can be 11 AM, 2 PM, 6 PM, 9 PM, and the next day. Alternately, the choices offered to the recipient can be one hour later, two hours later, three hours later, five hours later, and 24 hours later.

Meanwhile, the listener module 202 can detect when a recipient (e.g., an existing or potential customer) selects the "remind me later" option in an electronic communication. In addition, the listener module 202 can detect a time when the recipient opened the electronic communication and/or selected the "remind me later" option. In response to detecting the selection of the "remind me later" option, the listener module 202 can cause an update to the recipient's profile and/or the trigger module 204 to transmit a second email to the recipient at a later time. For example, the listener module 202 can detect that the recipient opened an email and/or actuated a "remind me later" button at 1 PM. As a result, the trigger module 204 can transmit the same electronic communication again based on the choice selected by the recipient. Alternately, the trigger module 204 can determine to transmit additional reminder emails at a time that is determined based on when the electronic communication was opened and/or when the "remind me later" option was selected.

Figure 8:
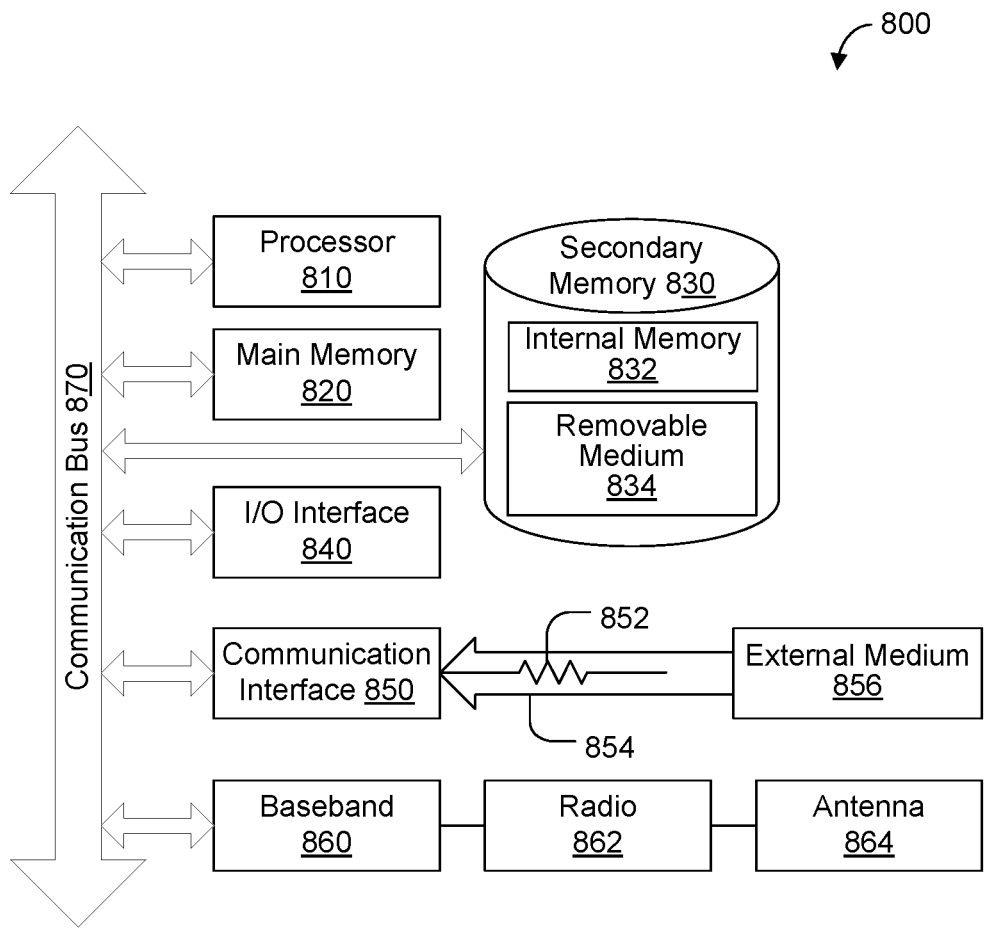
FIG. 8 is a block diagram of a device according to various embodiments.

FIG. 8 is a block diagram illustrating a device 800 according to various embodiments. In various embodiments, the device 800 can be used as is or in conjunction with one or more of the mechanisms or processes described above, and can represent components of server(s), user system(s), and/or other devices described herein. For example, the device 800 can be used to implement one or more of the servers 112, the first device 142, the second device 144, and/or the third device 146 and the modules and algorithms configured to run thereon. The device 800 can be a server or any conventional personal computer, or any other processor-enabled device that is capable of wired or wireless data communication. Other computer systems and/or architectures can be also used, as will be clear to those skilled in the art.

The device 800 preferably includes one or more processors, such as a processor 810. Additional processors can be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors can be discrete processors or can be integrated with the processor 810. Examples of processors which can be used with the device 800 include, without limitation, the Pentium® processor, Core i7® processor, and Xeon® processor, all of which are available from Intel Corporation of Santa Clara, Calif.

The processor 810 is preferably connected to a communication bus 870. The communication bus 870 can include a data channel for facilitating information transfer between storage and other peripheral components of the device 800. The communication bus 870 further can provide a set of signals used for communication with the processor 810, including a data bus, address bus, and control bus (not shown). The communication bus 870 can comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

The device 800 preferably includes a main memory 820 and can also include a secondary memory 830. The main memory 820 provides storage of instructions and data for programs executing on the processor 810, such as one or more of the functions and/or modules discussed above. It should be understood that programs stored in the memory and executed by the processor 810 can be written and/or compiled according to any suitable language, including without limitation C/C++, Java, JavaScript, Pearl, Visual Basic, .NET, and the like. The main memory 820 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 830 can optionally include an internal memory 832 and/or a removable storage medium 430, for example a floppy disk drive, a magnetic tape drive, a compact disc (CD) drive, a digital versatile disc (DVD) drive, other optical drive, a flash memory drive, etc. The removable storage medium 430 is read from and/or written to in a well-known manner. The removable storage medium 430 can be, for example, a floppy disk, magnetic tape, CD, DVD, SD card, etc.

The removable storage medium 430 can be a non-transitory computer-readable medium having stored thereon computer executable code (i.e., software) and/or data (e.g., for implementing at least a portion of the subject matter described herein). The computer software or data stored on the removable storage medium 430 is read into the device 800 for execution by the processor 810.

In alternative embodiments, the secondary memory 830 can include other similar means for allowing computer programs or other data or instructions to be loaded into the device 800. Such means can include, for example, an external storage medium 445 and an interface 440. Examples of the external storage medium 445 can include, for example, but not limited to, an external hard disk drive or an external optical drive, or and external magneto-optical drive.

Other examples of the secondary memory 830 can include semiconductor-based memory such as programmable read-only memory (PROM), erasable programmable read-only memory (EPROM), electrically erasable read-only memory (EEPROM), or flash memory (block oriented memory similar to EEPROM). Also included are a removable storage media 430 and a communication interface 850, which allow software and data to be transferred from an external medium 856 to the device 800.

The device 800 can include a communication interface 850. The communication interface 850 allows software and data to be transferred between the device 800 and various external devices (e.g. printers), networks, or information sources. For example, computer software or executable code can be transferred to the device 800 from a network server via the communication interface 850. Examples of the communication interface 850 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 firewire, or any other device capable of interfacing the device 800 with a network or another computing device.

The communication interface 850 preferably implements industry promulgated protocol standards including, for example, but not limited to Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but can also implement customized or non-standard interface protocols as well.

Software and data transferred via Communication Interface 440 are generally in the form of electrical communication signals 852. The electrical communication signals 852 are preferably provided to the communication interface 850 via a communication channel 854. In one embodiment, the communication channel 854 can be a wired or wireless network, or any variety of other communication links. The communication channel 854 carries the electrical communication signals 852 and can be implemented using a variety of wired or wireless communication means including, for example, but not limited to, wire or cable, fiber optics, conventional phone line, cellular phone link, wireless data communication link, radio frequency ("RF") link, or infrared link, just to name a few.

Computer executable code (i.e., computer programs or software) is stored in the main memory 820 and/or the secondary memory 830. Computer programs can also be received via the communication interface 850 and stored in the main memory 820 and/or the secondary memory 830. Such computer programs, when executed, enable the device 800 to perform the various functions, such as those described herein.

In this description, the term "computer readable medium" is used to refer to any non-transitory computer readable storage media used to provide computer executable code (e.g., software and computer programs) to the device 800. Examples of these media include the main memory 820, the secondary memory 830 (including the internal memory 832, the removable medium 834, and the external storage medium 445), and any peripheral device communicatively coupled with the communication interface 850 (including a network information server or other network device). These non-transitory computer readable mediums are means for providing executable code, programming instructions, and software to the device 800.

In an embodiment that is implemented using software, the software can be stored on a computer readable medium and loaded into the device 800 by way of the removable medium 834, the I/O interface 840, or the communication interface 850. In such an embodiment, the software is loaded into the device 800 in the form of the electrical communication signals 852. The software, when executed by the processor 810, preferably causes the processor 810 to perform the inventive features and functions previously described herein.

In an embodiment, the I/O interface 840 provides an interface between one or more components of the device 800 and one or more input and/or output devices. Example input devices include, without limitation, keyboards, touch screens or other touch-sensitive devices, biometric sensing devices, computer mice, trackballs, pen-based pointing devices, camera, microphone, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The device 800 also includes optional wireless communication components that facilitate wireless communication over a voice and over a data network. The wireless communication components can comprise an antenna system 864, a radio system 862, a baseband system 860, or any combination thereof. In the device 800, radio frequency (RF) signals are transmitted and received over the air by the antenna system 864 under the management of the radio system 862.

In one embodiment, the antenna system 864 can comprise one or more antennae and one or more multiplexors (not shown) that perform a switching function to provide the antenna system 864 with transmit and receive signal paths. In the receive path, received RF signals can be coupled from a multiplexor to a low noise amplifier (not shown) that amplifies the received RF signal and sends the amplified signal to the radio system 862.

In alternative embodiments, the radio system 862 can comprise one or more radios that are configured to communicate over various frequencies. In one embodiment, the radio system 862 can combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 862 to the baseband system 860.

If the received signal contains audio information, the baseband system 860 decodes the signal and converts it to an analog signal. Then the signal is amplified and sent to a speaker. The baseband system 860 also receives analog audio signals from a microphone. These analog audio signals are converted to digital signals and encoded by the baseband system 860. The baseband system 860 also codes the digital signals for transmission and generates a baseband transmit audio signal that is routed to the modulator portion of the radio system 862. The modulator mixes the baseband transmit audio signal with an RF carrier signal generating an RF transmit signal that is routed to the antenna system and can pass through a power amplifier (not shown). The power amplifier amplifies the RF transmit signal and routes it to the antenna system 864 where the signal is switched to the antenna port for transmission.

The baseband system 860 is also communicatively coupled with the processor 810. The processor 810 has access to the main memory 820 and the secondary memory 830. The processor 810 is preferably configured to execute instructions (i.e., computer programs or software) that can be stored in the main memory 820 or the secondary memory 830. Computer programs can also be received from the baseband processor 460 and stored in the main memory 820 or in the secondary memory 830, or executed upon receipt. Such computer programs, when executed, enable the device 800 to perform the various functions, such as those described herein. For example, the main memory 820 and the secondary memory 830 can each include various software modules (not shown).

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

In situations in which the systems discussed here collect personal information about users, or can make use of personal information, the users can be provided with an opportunity to control whether programs or features collect user information (e.g., information about a user's social network, social actions or activities, profession, a user's preferences, or a user's current location), or to control whether and/or how to receive content from the content server that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by a content server.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes can be made in these example implementations without departing from the subject matter described herein as defined in the appended claims and their equivalents.

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed is:

1. A communications platform, comprising:
   at least one hardware processor;
   a database configured to store profile data for a plurality of contacts, a plurality of audience filters, and a plurality of triggered messaging processes; and
   at least one executable software module that, when executed by the at least one hardware processor, performs operations comprising:
   presenting a user interface to a user, the user interface configured to allow the user to define a plurality of supplemental events including supplemental data associated with the user's interaction with the platform or communications generated by the platform;
   detecting one of the plurality of supplemental events associated with the plurality of contacts, which are remote from the platform;
   for each of the plurality of supplemental events, when an event is detected:
   collecting environment data associated with the event;
   correlating the environment data and updated supplemental data, wherein the updated supplemental data comprises a change to the supplemental data defined by the user;
   configuring one triggered message process, of the plurality of triggered messaging processes, that defines a plurality of actions based on the updated supplemental data and based on the correlation between such data and the environment data; and
   performing the plurality of actions defined by the configured one triggered message process.

2. The communications platform of claim 1, wherein the environment data includes one or more of: a location of the event, a weather at the location of the event, social media data at a time of the event, and stock market data from the time of the event.

3. The communications platform of claim 1, wherein the plurality of actions comprises one or more of: transmitting an electronic message, pushing a notification, and instigating an application programming interface callback.

4. The communications platform of claim 1, wherein the environment data includes at least one or more of: a weather at the location of the event, social media data at a time of the event, and stock market data from the time of the event.

5. The communications platform of claim 1, wherein the plurality of actions comprises at least instigating an application programming interface callback.

6. The platform of claim 1, wherein the plurality of actions are defined by the configured triggered message process and at least one of the plurality of audience filters.

7. A communications platform, comprising:

at least one hardware processor;

a database configured to store profile data for a plurality of contacts, a plurality of audience filters, and a plurality of triggered messaging processes; and at least one executable software module that, when executed by the hardware processor, performs operations comprising:

presenting a user interface to a user, the user interface configured to allow the user to define a plurality of supplemental events associated with the user's interaction with the platform or communications generated by the platform;

detecting one of the plurality of supplemental events associated with the plurality of contacts, which are remote from the platform;

for each of the plurality of supplemental events, when an event is detected:
- collecting environment data associated with the event;
- correlating the environment data and detected supplemental data;
- collecting profile event data, wherein the profile event data includes one or more events altering the profile data of a contact of the plurality of contacts;
- correlating the profile event data with the environmental data, detected supplemental data, or both;
- configuring one of the plurality of triggered messaging processes that defines a plurality of actions based on the detected supplemental data and based on the correlation between such data and the environment data; and
- performing the plurality of actions defined by the configured triggered message process, wherein the plurality of actions is further based on one or both of: (i) the profile event data, and (ii) the correlation between the profile event data with the environment data, detected supplemental data, or both.

8. The platform of claim 7, wherein the one or more events altering the profile data of the contact include a contact subscribing to a newsletter or a mailing list in response to an electronic communication.

9. The platform of claim 8, wherein the plurality of actions defined by the configured triggered message process includes transmitting an additional electronic communication to the associated contact of the plurality of contacts in response to the event.

10. A communications platform, comprising:

at least one hardware processor;

a database configured to store profile data for a plurality of contacts, a plurality of audience filters, and a plurality of triggered messaging processes; and at least one executable software module that, when executed by the hardware processor, performs operations comprising:

presenting a user interface to a user, the user interface configured to allow the user to define a plurality of supplemental events associated with the user's interaction with the platform or communications generated by the platform;

detecting one of the plurality of supplemental events associated with the plurality of contacts, which are remote from the platform;

for each of the plurality of events, when an event is detected:
- collecting environment data associated with the event;
- correlating the environment data and detected supplemental data;
- collecting email behavior data, wherein the email behavior data includes at least one of sending a message, opening a message, clicking a message, sharing a message, purchasing from or as a result of a message, or opting out of a message;
- correlating the email behavior data with the environmental data, detected supplemental data, or both;
- configuring one of the plurality of triggered messaging processes that defines a plurality of actions based on the detected supplemental data and based on the correlation between such data and the environment data; and
- performing the plurality of actions defined by the configured triggered message process, wherein the plurality of actions is further based on one or both of (i) the email behavior data, and (ii) the correlation between the email behavior data with the environmental data, detected supplemental data, or both.

* * * * *